(12) United States Patent
Warren et al.

(10) Patent No.: US 8,235,417 B2
(45) Date of Patent: Aug. 7, 2012

(54) APPARATUS AND METHOD FOR RELEASING AN INFLATION GAS FROM AN INFLATOR

(75) Inventors: Donald E. Warren, Tipp City, OH (US); Jeremy A. Estes, Troy, OH (US)

(73) Assignee: NXGen Technologies, LLC, Meza, AZ (US)

( * ) Notice: Subject to any disclaimer, the term of this patent is extended or adjusted under 35 U.S.C. 154(b) by 61 days.

(21) Appl. No.: 12/815,809

(22) Filed: Jun. 15, 2010

(65) Prior Publication Data

US 2011/0057428 A1    Mar. 10, 2011

Related U.S. Application Data

(60) Provisional application No. 61/186,992, filed on Jun. 15, 2009.

(51) Int. Cl.
*B60R 21/268* (2011.01)
(52) U.S. Cl. ........................................... 280/737
(58) Field of Classification Search .............. 102/530, 102/531; 280/736, 737, 741
See application file for complete search history.

(56) References Cited

U.S. PATENT DOCUMENTS

| | | | |
|---|---|---|---|
| 3,209,937 A * | 10/1965 | Hirst et al. | 220/265 |
| 3,788,596 A * | 1/1974 | Maeda | 251/69 |
| 4,203,616 A * | 5/1980 | Okada | 280/737 |
| 4,289,327 A * | 9/1981 | Okada | 280/737 |
| 5,131,680 A | 7/1992 | Coultas et al. | |
| 6,206,420 B1 * | 3/2001 | Skanborg et al. | 280/737 |
| 6,247,725 B1 * | 6/2001 | Moller | 280/737 |
| 6,543,806 B1 | 4/2003 | Fink | |
| 6,612,326 B2 * | 9/2003 | Specht et al. | 137/68.13 |
| 6,669,232 B2 * | 12/2003 | Specht | 280/736 |
| 6,726,241 B2 * | 4/2004 | Welz | 280/737 |
| 6,820,898 B2 * | 11/2004 | Dinsdale et al. | 280/737 |
| 7,316,417 B2 * | 1/2008 | Young et al. | 280/737 |
| 7,695,009 B2 * | 4/2010 | Johanson et al. | 280/737 |
| 7,784,827 B2 * | 8/2010 | Smith et al. | 280/737 |
| 2008/0246260 A1 | 10/2008 | Warren et al. | |
| 2009/0058058 A1 | 3/2009 | Finnigan et al. | |

OTHER PUBLICATIONS

International Search Report dated Feb. 8, 2011; International Application No. PCT/US2010/038625.
Written Opinion dated Feb. 8, 2011; International Application No. PCT/US2010/038625.

* cited by examiner

*Primary Examiner* — Joseph Rocca
(74) *Attorney, Agent, or Firm* — Cantor Colburn LLP (57) ABSTRACT

An external containment device for an inflator of an inflatable cushion is provided, the external containment device having: an outlet plate having an outlet opening; a burst disk disposed over the outlet opening; an initiator having an initiator cap; a support pin having a shaft portion and a head portion, the shaft portion being supported by the initiator cap and the head portion contacts the burst disk when the outlet opening is sealed by the burst disk; and wherein activation of the initiator causes the initiator cap to move shearing a portion of the shaft portion from the support pin which allows the burst disk to rupture.

18 Claims, 5 Drawing Sheets

APPARATUS AND METHOD FOR RELEASING AN INFLATION GAS FROM AN INFLATOR

CROSS REFERENCE TO RELATED APPLICATIONS

This application claims the benefit to U.S. Provisional Patent Application Ser. No. 61/186,992 filed Jun. 15, 2009 the contents of which are incorporated herein by reference thereto.

BACKGROUND

Exemplary embodiments of the present invention relate to an apparatus and method for containing gas in an airbag inflator and releasing the gas at a variable rate into an inflatable cushion. The inflator provides gas for the inflation of automotive airbags for the purpose of protecting vehicle occupants from injury in the event of a crash. Gas must be provided quickly for occupant protection in side impact crashes. For crashes involving vehicle rollover, inflation of the airbag is required for an extended period of time.

Today some vehicles are supplied with side airbag modules. A side airbag module comprises inflatable cushions or curtains that traverse a side portion of the vehicle when they are deployed in accordance with a predetermined activation event. Generally, the device is located along a side of the vehicle in an un-inflated state and upon activation deploys an inflatable curtain along a side portion of the vehicle. Side impact air bags or inflatable cushions are often mounted in close proximity to the vehicle's roof rail, doorframe or center pillars, or in some instances within the side door. Accordingly, the space or housing for the un-inflated airbag is compact and extends or traverses along the window area or frame, as the airbag cannot be installed in the areas comprising the window. Moreover, it is also desirable to have the inflatable cushion disposed behind a decorative trim portion of the vehicle's interior. Thus, the presence of the side airbag device is not observable to occupants when it is in its un-deployed state.

Substantial efforts have been directed to developing inflatable cushions or curtains having extended periods of inflation or in other words inflatable cushions that will retain their inflation gases for a period time after inflation. Some methods for providing this extended period of inflation is to minimize the inflation gas leakage by providing a one-piece-woven curtain airbag or by applying a sealant at the seams where the two sides of an inflatable cushion are sealed together. However, both of these methods are costly as they add additional manufacturing steps and methods.

Extended airbag inflation time may be achieved by slowly releasing gas stored in a secondary chamber (See U.S. Pat. No. 6,543,806 B1) and using higher viscosity gases (See U.S. Pat. No. 6,883,830 B2). A combination of these features provides both side impact and rollover protection with a single device (See U.S. Patent Publication No. 20080246260). The release rate of the gas must be controlled accordingly. A larger discharge opening is required for a high viscosity gas compared to the opening required for a low viscosity gas.

Accordingly, it is desirable to provide an airbag module capable of providing an inflatable cushion or curtain with an extended period of inflation and an apparatus and method for containing and releasing the inflation gas from the inflator.

SUMMARY OF THE INVENTION

A method and apparatus for releasing inflation gas of an inflator is provided. In one embodiment, an external containment device for an inflator of an inflatable cushion is provided, the external containment device having: an outlet plate having an outlet opening; a burst disk disposed over the outlet opening; an initiator having an initiator cap; a support pin having a shaft portion and a head portion, the shaft portion being supported by the initiator cap and the head portion contacts the burst disk when the outlet opening is sealed by the burst disk; and wherein activation of the initiator causes the initiator cap to move shearing a portion of the shaft portion from the support pin which allows the burst disk to rupture.

In another exemplary embodiment an inflation device for inflating an inflatable cushion of an airbag module is provided, the inflation device having: a first chamber and a second chamber, the first chamber having a first volume of inflation gas and the second chamber having a second volume of inflation gas; a first inflation opening for allowing the first volume of inflation gas to pass therethrough; a second inflation opening for allowing the second volume of inflation gas to pass into the second chamber; an external containment device sealing the first inflation opening, the containment device having: an outlet plate having an outlet opening; a burst disk disposed over the outlet opening; an initiator having an initiator cap; a support pin having a shaft portion and a head portion, the shaft portion being supported by the initiator cap and the head portion contacts the burst disk when the outlet opening is sealed by the burst disk; and wherein activation of the initiator causes the initiator cap to move shearing a portion of the shaft portion from the support pin which allows the burst disk to rupture.

In yet another exemplary embodiment a method of rupturing a burst disk of an inflator, the method having the steps of: supporting the burst disk with a support pin having a shaft portion and a head portion, the shaft portion being supported by an initiator cap of an initiator and the head portion contacting the burst disk, wherein the burst disk is disposed over an outlet opening; and shearing the shaft portion of the pin by moving the initiator cap from a first position to a second position by activating the initiator, wherein the head portion no longer supports the burst when the initiator cap is at the second position and the shaft portion is sheared from the support pin.

DETAILED DESCRIPTION OF THE PREFERRED EMBODIMENTS

Reference is made to the following U.S. Pat. Nos. 7,497, 466; 6,543,806; 6,883,830 and U.S. Patent Publication Nos.

US20080246260; US20080023947; and US20080042407, the contents each of which are incorporated herein by reference thereto.

Referring now to the accompanying drawings various embodiments of the present invention will be described. The embodiments discussed herein are provided by way of explanation of the invention and are not intended as limitations of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

This application relates to methods and apparatus for providing extended inflator output in vehicle airbag systems. More particularly, exemplary embodiments are directed to an apparatus and method for releasing the inflation gas of an inflator.

Various embodiments are directed to a device for the containment and release of high viscosity pressurized gas through a large discharge opening in an airbag inflator. This invention provides improvement to existing devices by allowing reduced diameter, reduced mass and reduced complexity for manufacture.

The disclosure of the present application relates to an air bag module. More particularly, exemplary embodiment of the present invention are directed to inflation devices, assemblies, and methods of inflating an inflatable device which may supply or furnish inflation gas in a manner that will provide or result in an extended stand-up time for an associated inflatable device. In addition, exemplary embodiments are directed to apparatus and methods to provide such inflation devices.

Exemplary embodiments of the present invention are directed to a device for the containment and release of pressurized gas from an airbag inflator. In one non-limiting exemplary embodiment, the inflator is filled with an inert gas to a pressure >6000 psi. Of course, exemplary embodiments of the present invention contemplate pressures less than or equal to 6000 psi.

In an exemplary embodiment, the gas is sealed in an inflator container with thin metal membrane or burst disk and external support is provided to the metal membrane to prevent inadvertent inflator discharge by preventing the pressurized gas from escaping the inflator container.

When used for side impact devices extended inflation time is desirable. Extended inflation time may be achieved by slowing releasing gas stored in a secondary chamber and using higher viscosity gases. A combination of these methodologies provides the desired performance from a single device. The release rate of the inflation gases must be controlled in addition, high viscosity gases typically require larger discharge openings than lower viscosity gases.

In accordance with an exemplary embodiment of the present invention, an external device is contemplated for supporting a burst disk or metal membrane covering a large inflation opening against a high viscosity gas stored behind the burst disk.

The external device will position a support member in front of the burst disk and upon activation of an initiator the support member will be released from its supporting position and the disk will be allowed to burst thereby releasing the stored gas. In addition, the burst disk must also meet additional constraints namely the metal membrane or burst disk must rupture at a minimum of 1.25 times service pressure of the inflator and at a maximum of 0.8 times the burst pressure of the gas container.

In addition, the gas must be contained over range of environmental exposures and as well as allow safe pressure relief at high temperatures.

This application also relates to methods and apparatus for providing extended inflator output in vehicle air bag systems. More particularly, exemplary embodiments are directed to an apparatus that is configured to provide an extended inflator output for use with an inflatable cushion.

Figure 1:
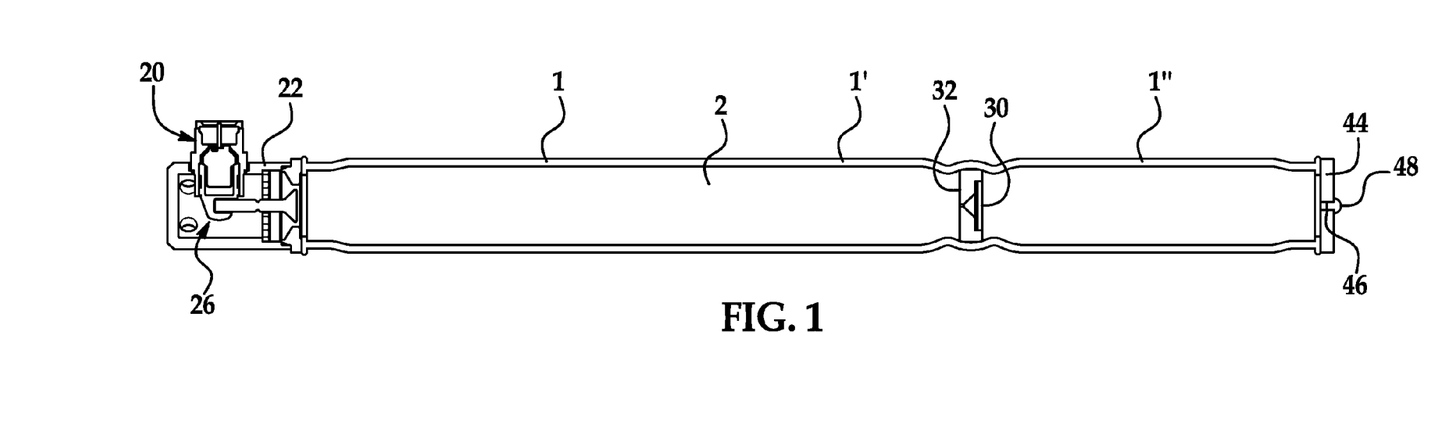
FIG. 1 is a cross-sectional view of an inflator with a closure assembly in accordance with an exemplary embodiment of the present invention.
Figure 1A:
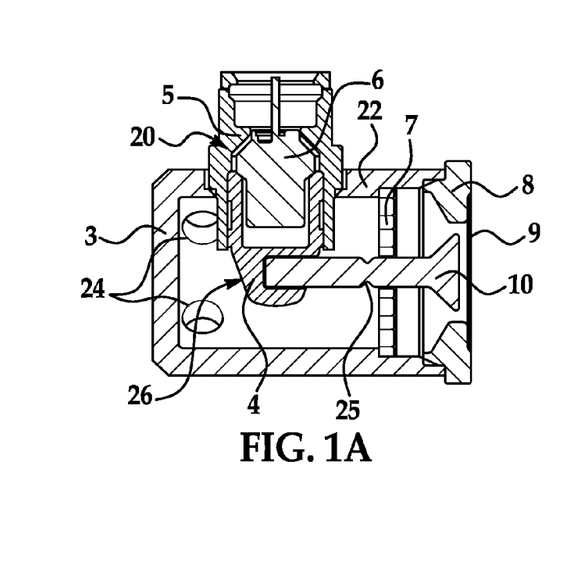
FIG. 1A is an enlarged view of the closure assembly of FIG. 1 in a pre-deployment configuration.
Figure 2:
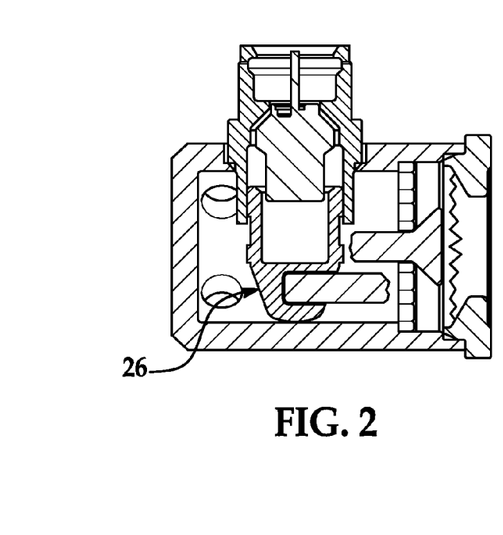
FIG. 2 is an enlarged view of the closure assembly of FIG. 1A in a post deployment configuration.
Figure 3:
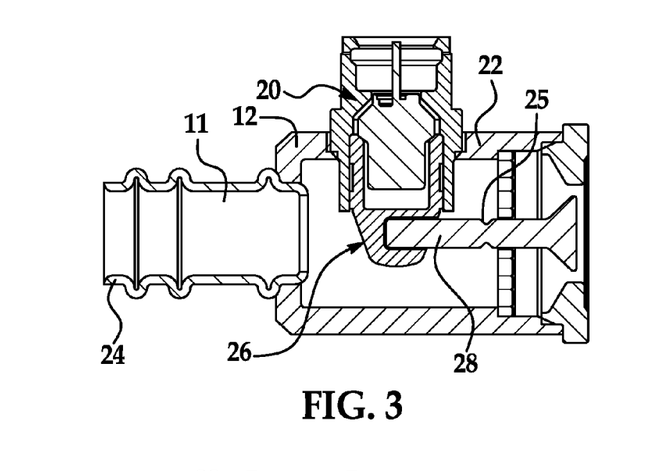
FIG. 3 is an enlarged view of a closure assembly of an alternative embodiment in a pre-deployment configuration.

Referring now to FIGS. 1-3 of U.S. Patent Publication US 2008 0246260 incorporated herein by reference thereto, an inflatable cushion or air bag is illustrated. The air bag is manufactured and constructed in order to deploy in a variety of vehicle configurations. As discussed herein, exemplary embodiments of the present invention are related to apparatus and methods for providing extended inflator output for use with inflatable cushions. As used herein "inflatable cushions" is intended to refer to side curtain air bags, driver side air bags, passenger side air bags, etc. FIG. 1 of U.S. Patent Publication US 2008 0246260 provides a non-limiting example of an air bag or inflatable cushion mounted to a vehicle in a stored or non-deployed state. As illustrated, the vehicle comprises a front pillar, a rear pillar, and, if the vehicle is so equipped (e.g., it has more than one door per side), a center pillar or pillars. Such pillars are referred to by those skilled in the related arts as A, B, C and D pillars. The inflatable cushion is stored and mounted on or proximate to a vehicle roof rail beneath a headliner. In some applications a first tether or connecting means connects a front portion of the inflatable cushion to the front pillar and a second tether or connecting means connects a rear portion of the inflatable cushion to the rear pillar.

It is, of course, understood that depending on the application requirements or configuration of the air bag device, the inflatable cushion may not require the front and rear connecting means. Thus, connecting the front and rear connecting means are provided as examples and exemplary embodiments of the present invention is not intended to be limited by the same.

As illustrated in U.S. Patent Publication US 2008 0246260, the rear portion of the air bag is in fluid communication with a gas generator or inflator positioned to provide an inflation gas to inflate the inflatable cushion via a diffuser tube having a plurality of diffuser openings disclosed therein. It is, of course, understood and as applications may vary, the inflator may be positioned in other locations than those illustrated in the drawings. For example, the inflator may be located in a position farther forward in the vehicle such as the door pillar, the front pillar, or another location or locations. In addition, the diffuser tube may be configured to extend through a portion of the inflatable cushion, wherein a plurality of openings are positioned in the diffuser tube that traverses through an interior portion of the inflatable cushion. Thus, the presented location is provided as an example and the present invention is not intended to be limited by the same. In yet another alternative, the inflator may be remotely located and a conduit or other fluid providing means used to supply the inflating gas from the inflator to the inflatable cushion.

FIGS. 2 and 3 of U.S. Patent Publication US 2008 0246260 illustrate the inflatable cushion of two different non-limiting designs in an inflated or deployed state. As illustrated, the inflatable cushion comprises a deploying edge, which comprises the bottom portion of the air bag that traverses across the window openings or window frames of the vehicle. The air bag also comprises a forward edge, a rearward edge and a fixed edge. The fixed edge represents the portion of the air bag that remains in substantially the same position regardless of whether the air bag is deployed or not.

Many different types of air bags or inflatable cushion arrangements (e.g., internal cavities, tethers or seams) are contemplated to be used with exemplary embodiments of the present invention. It is understood that the configuration of inflatable cushion may vary and that the illustrations in FIGS. 1 and 2 of U.S. Patent Publication US 2008 0246260 are provided as examples and exemplary embodiments of the present invention are not intended to be limited to the specific configurations provided, as they are considered ancillary to the present invention. Moreover, the present invention is contemplated for use with other vehicle configurations than those illustrated in the FIGS. of U.S. Patent Publication US 2008 0246260. For example, the vehicle may include three or more rows of seats. Such vehicles include but are not limited to sport utility vehicles, station wagons, vans or minivans. Conversely, the vehicle may comprise only a single row of seats, such vehicles including but not limited to sports coupes.

The inflatable cushion may be made of any air bag material suitable for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall air bag shape. Prior to deployment, the inflatable cushion is stored in a compartment mounted to the roof rail or proximate to the roof rail. In order to store the air bag into the compartment, the un-inflated air bag is folded into a configuration which allows it to occupy a small discrete area within the vehicle interior.

In one implementation the fixed edge comprises a plurality of mounting portions, which comprise a portion of the inflatable cushion from which the fixed edge depends. The mounting portions are each secured to an attachment apparatus, which is configured to slidably engage a feature (e.g., mounting surface, mounting aperture) of the vehicle surface that is configured to engage the attachment apparatus. Alternatively, the fixed edge may be configured to have the attachment apparatus secured thereto negating the need for the mounting portions. In implementation, each apparatus is fixedly secured to the air bag via any suitable method, including rivets, bolts, studs, adhesives, etc. or equivalents thereof. In one variation the apparatus is insert molded about a portion of the inflatable cushion.

Referring now to FIGS. 1-9A, exemplary embodiments of the present invention are illustrated. Here the inflator 1 has a first inflation chamber 1' for storing a first volume of a compressed gas for inflation of the inflatable cushion during a predetermined activation event. As illustrated, the first inflation chamber further comprises initiator 20 positioned at one end the first inflation chamber. In one non-limiting exemplary embodiment initiator is a pyrotechnic device or pyrotechnic squib that will fire when a signal is received providing an activation force.

In accordance with an exemplary embodiment, initiator 20 is mounted to the first inflation chamber by an external support assembly or external containment device comprising a housing 22 that is secured to an end of the first inflation chamber. Housing 22 is also configured to provide outlet openings 24 for radial dispersement or in the embodiment of FIG. 3 an outlet orifice 24, which will be in fluid communication with the first inflation chamber when the burst disk is ruptured. Accordingly, the outlet housing is configured to be in fluid communication with an outlet opening of the first inflation chamber that is sealed by a burst disk comprising in one embodiment a thin metal membrane.

The inflator pressure vessel 1 is filled with an inert gas 2. The gas is sealed in the inflator pressure vessel with a thin metal membrane 9. This membrane known as a burst disk blocks a large discharge opening in the outlet plate 8. A movable support assembly 26 externally supports the burst disk against a pressure exerted by the high viscosity stored gas. The supported burst disk seals the discharge opening and prevents pressurized gas from escaping the inflator pressure vessel after it is filled with gas (FIG. 1).

The burst disk support assembly begins with a support pin 10. The support pin has a large diameter head which contacts the burst disk. A smaller diameter shaft on the support pin is placed through a hole in an outlet screen 7 and into a pocket 28 in an initiator cap 4. The initiator cap slides into the initiator retainer 5 and captures the initiator 6. This support assembly is attached to the sidewall of the closure 3.

For gas containment, the supported burst disk must not rupture under normal environmental conditions. However, in the event of a fire, the device must safely release gas. Under this condition the burst disk must rupture at a minimum of 1.25 times service pressure of the inflator and at a maximum of 0.8 times the burst pressure of the gas container. An annular opening provided around the head of the support pin and the opening of the outlet plate provides control of the pressure at which the burst disk will rupture. As the gas container is pressurized, the burst disk deforms into the annulus created by the support pin and the outlet plate. The burst disk ruptures into this annulus at the desired pressure and the gas is discharged at a low rate. The rupture pressure of the burst disk is controlled by the diameters and edge radius on the head of the support pin and discharge opening of the outlet plate and the properties of the burst disk. The support pin may be under bending loads under static conditions, but is prevented from buckling by the constraints provided by the initiator cap and outlet screen.

For gas release, the initiator is activated and pressurizes the chamber inside the initiator cap. This causes the initiator cap to slide out of the initiator retainer. Motion of the cap produces a force on the end of the support pin which is constrained by the pocket in the cap. The support pin is also constrained near the midpoint of its shaft by the outlet screen. A groove 25 is located in the diameter of the shaft of the support pin between the initiator cap and the outlet screen. The two constraints on the shaft of the support pin, coupled with the force resulting from motion of the initiator cap, creates a stress which causes the support pin to break at the groove location (FIG. 2).

Figure 4:
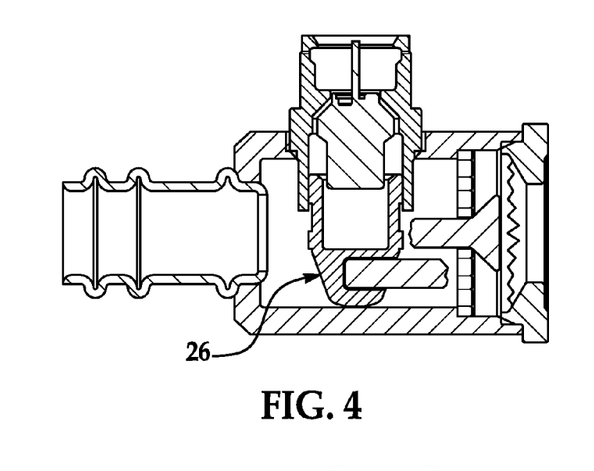
FIG. 4 is an enlarged view of the closure assembly of FIG. 3 in a post deployment configuration.

This break in the support pin allows the head of the pin to stroke away from the burst disk. Once the burst disk loses support, it ruptures allowing gas to exit through the large discharge orifice. The outlet screen captures the head of the support pin after it has been released since the head of the pin is larger than the opening the shaft of the pin slides in. The gas flows around the burst disk support assembly components and exits through holes in the side wall of the closure for radial output 3 or through an outlet post 11 which can be attached to the end of the closure for axial output 12 (FIGS. 3 and 4).

The output from the inflator must not include debris that could puncture the inflatable cushion. The outlet screen contains multiple holes to capture fragments from the burst disk and retain the head of the pin support. The shaft of the support pin is trapped between the initiator cap and the outlet screen. Debris generated from the initiator is trapped in the closed volume that is maintained around the initiator after the initiator cap has stroked.

Figure 5:
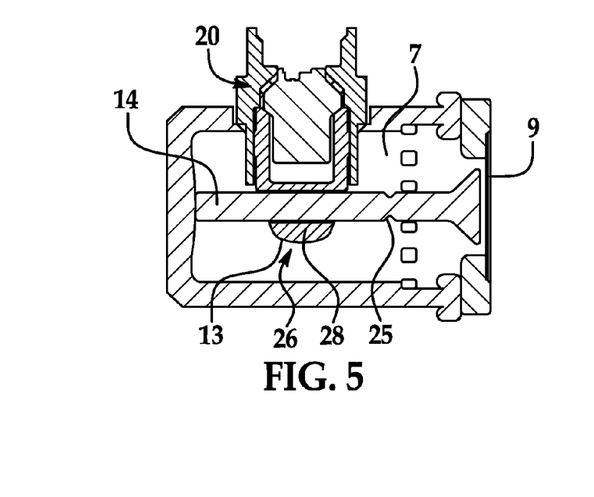
FIG. 5 is an enlarged view of a closure assembly of another alternative embodiment in a pre-deployment configuration.
Figure 6:
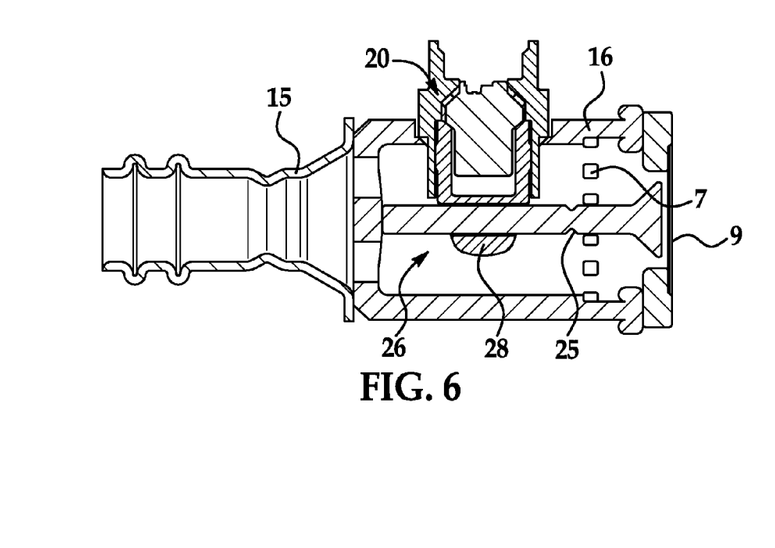
FIG. 6 is an enlarged view of the closure assembly of FIG. 5 in a post deployment configuration.
Figure 7:
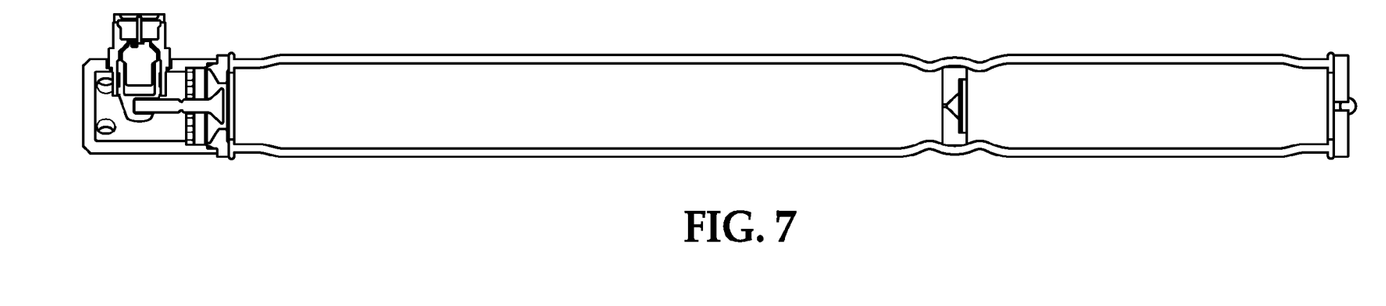
FIGS. 7-9A illustrate exemplary embodiments of the present invention.
Figure 7A:
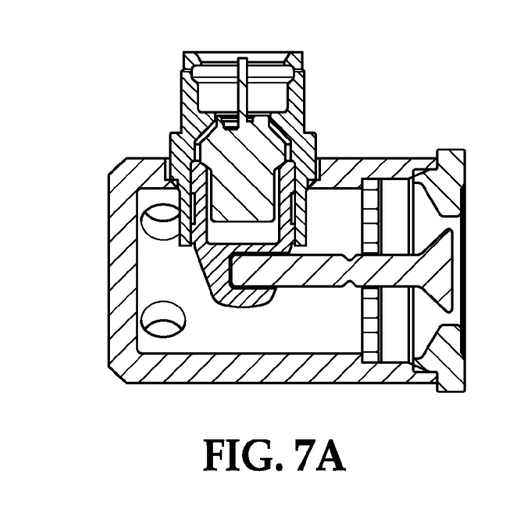
Figure 7B:
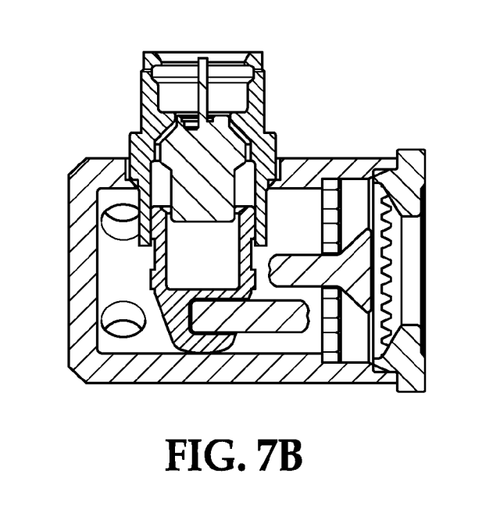
Figure 8:
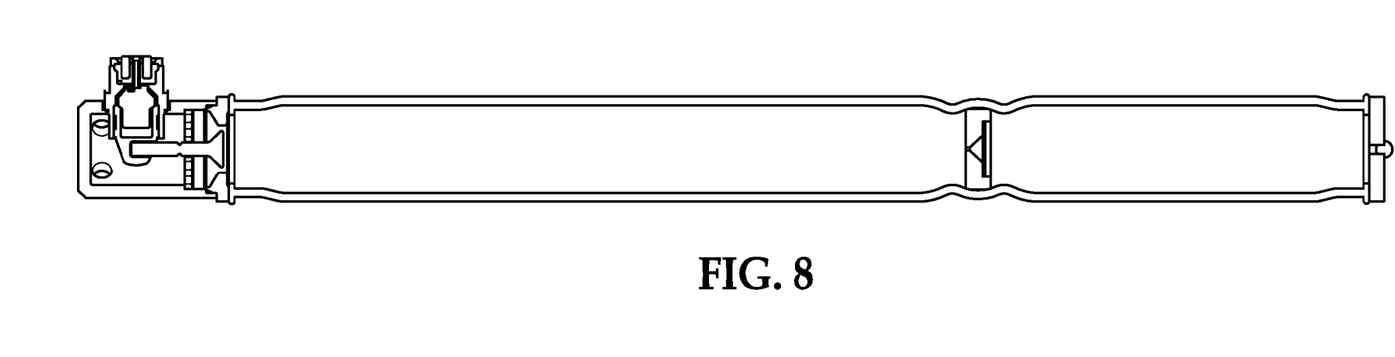
Figure 8A:
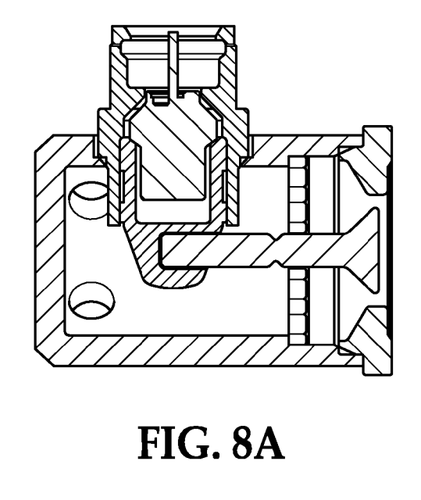
Figure 9:
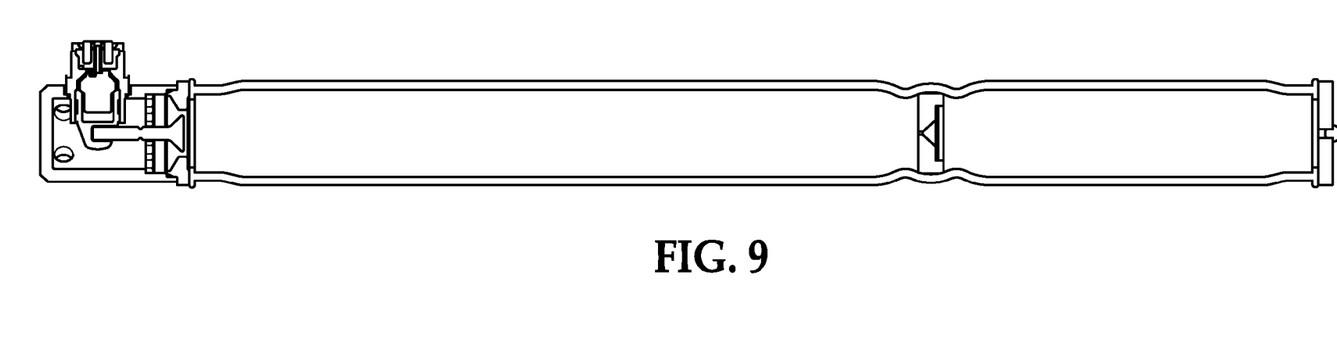
Figure 9A:
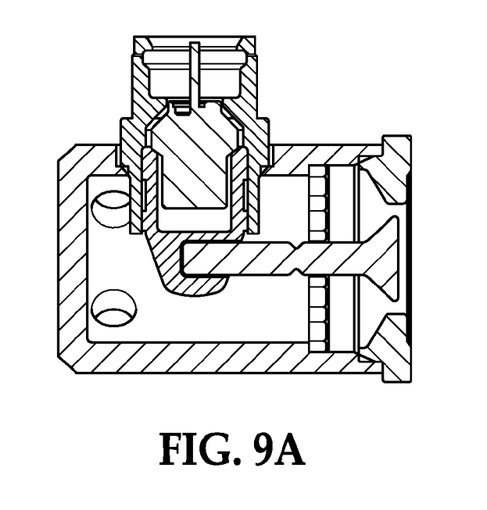

In another embodiment and as illustrated in FIGS. 5 and 6, the support pin 13 passes through the initiator cap 14 and contacts the end wall of the closure 16. Gas exits through holes in the side of the closure for radial output (FIG. 5), or holes in the end of the closure and into an outlet post 15 for axial output (FIG. 6).

As is known in the related arts, the initiator is electrically coupled to a sensing in diagnostic module configured to receive and interpret signals from a plurality of sensors disposed within the vehicle in order to determine whether an activation signal is to be sent to the initiator. Upon receipt of the activation signal the initiator will fire and allow the burst disk to rupture by shearing a portion of the support pin.

During this activation event the initiator cap strokes or travels downward and shears off a portion of the support pin received in an opening of the initiator cap. Once the support pin is sheared off the burst disk will rupture and fluid communication is provided between the first inflation chamber and an inflatable cushion after the initiator has been activated and the burst disk has been removed from the outlet opening.

In addition and thereafter the release of the pressure from the first chamber will cause the a pin 30 to be pushed against and rupture a second burst disk 32 separating the first chamber from a second chamber 1", wherein fluid communication between the first and second chambers is not allowed. In one non-limiting exemplary embodiment, the orifice between the second and first chamber is smaller than the orifice between the first chamber and the outlet of the inflator.

As illustrated, inflator 1 further comprises a second inflation chamber 1". As illustrated, the second inflation chamber comprises a substantially smaller volume for holding a second amount of inflation gas, which is to be provided into the first inflation chamber and ultimately through the outlet opening via an output orifice disposed in an orifice plate, which provides fluid communication between the first inflation chamber and the second inflation chamber.

Inflator 1 also has an end plate 44. End plate 44 is configured to have a fill passageway 46 and a sealing means 48 secured therein after a predetermined volume of inflation gas is supplied to the first and second inflation chambers. In accordance with an exemplary embodiment fill passageway 46 may be closed or plugged in any fashion that allows the first inflation chamber to be filled with a first compressed volume of inflation gas and sealed.

A non-limiting example of a gas stored in the inflation chambers is argon, helium, carbon dioxide, nitrogen and equivalents and mixtures thereof.

In accordance with one exemplary embodiment, the initiator is received within an initiator retainer that may comprise a portion of the housing. The initiator retainer helps position the initiator such that upon activation of the same the burst disk will be allowed to rupture.

In one non-limiting embodiment, the openings between the two chambers of the inflator are of different sizes thus, the inflation output from the second inflation chamber may be at a substantially lower flow rate for an extended period of time then the first inflation chamber, which is adjacent to the initiator, wherein the extended period of time is substantially longer than the period of time for the inflation gases to flow out of the first chamber. Accordingly and in accordance with one exemplary embodiment of the present invention, the first inflation chamber is used to provide an initial output for initially deploying and inflating the inflatable cushion, while the second inflation chamber is used to provide a secondary or supplemental inflation output during and after the initial inflation of the inflatable cushion. In accordance with an exemplary embodiment of the present invention, the output of the second inflation chamber is configured to counteract the leakage of the inflation gases from the inflatable cushion during initial deployment period. In other words, and in order to provide an extended period of inflation of the inflatable cushion, the first inflation chamber is used to provide an initial inflation output in order to deploy the inflatable cushion into a desired inflated configuration thereafter, any leakage of the inflation gases used to inflate the inflatable cushion are counteracted by the supplemental inflation output of the second inflation chamber as the smaller orifice of the second inflation chamber allows the supplemental inflation to be provided over a longer time period than those typically encountered for release of all the gases in a single stage inflator.

In addition, and in accordance with an exemplary embodiment the containment device must also allow for controlled release of the inflator gases when the inflator is exposed to temperatures and/or pressures well above those of normal operating conditions (e.g., scenarios wherein activation of the initiator does not occur and the inflator is exposed to very high temperatures). In this embodiment, the support member prevents gas release under standard range of storage environments however, an annulus between the support member and the outlet plate allows bursting of the metal membrane and controlled release of gas at temperatures above storage environments. For example, if the inflator is exposed to very high temperatures the increasing gas temperature creates increased pressure and the metal membrane deforms into the annulus between the support and outlet plate. Thereafter, the membrane ruptures into the annulus at a desired pressure and the contained gas is discharged at a controlled rate. Accordingly, the rupture pressure is controlled by geometry of the support and outlet plate and properties of the metal membrane. In accordance with an exemplary embodiment the support member provides features to allow the bursting of the metal membrane and controlled release of gas at temperatures above storage environments.

While the invention has been described above making specific reference to embodiments wherein the first chamber and the second chamber, are longitudinally aligned, the broader practice of the invention is not necessarily so limited. Moreover and in one alternative embodiment, the external containment device may also be used for a single chamber inflator.

It is also understood that the configuration of the inflatable cushions may vary and the illustrations of the cushion in the Figures are provided as examples and the present invention is not intended to be limited to the specific configurations provided in the figures, as they are considered ancillary to the present invention.

Moreover, the present invention is contemplated for use with numerous other vehicle configurations. For example, the vehicle may include three rows of seats; such vehicles include but are not limited to sports utility vehicles, station wagons, vans or minivans. Conversely, the vehicle may comprise only a single row of seats such vehicles include but are not limited to sports coups. Therefore, the above-described airbag module may be easily modified to accommodate all types of vehicles in several different types of configurations.

Furthermore, prior to deployment, the inflatable cushion may be stored in a compartment mounted to the roof rail or proximate to the roof rail. In order to store the airbag into the compartment the un-inflated inflatable cushions are folded into configurations, which allow it to occupy small discrete areas within the vehicle interior.

When a predetermined activation event or occurrence is detected, the inflatable cushion is inflated by gas from the inflator. In general, the inflator will receive an inflation or deployment signal that causes the inflator to generate an inflation gas or inflation output for inflating the inflatable cushion. In the exemplary embodiments described above, the deployment signal is generated by a controller, such as a microcontroller of a sensing and diagnostic module configured for use with the airbag module. The sensing and diagnostic module receives a plurality of signals from appropriate sensing devices (e.g., door mounted accelerometers), and will generate a deployment signal if a predetermined activation event has been sensed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. An external containment device for an inflator, the containment device comprising:
    an outlet plate having an outlet opening;
    a burst disk disposed over the outlet opening;
    an initiator having an initiator cap;
    a support pin having a shaft portion and a head portion, the shaft portion being supported by the initiator cap and the head portion contacts the burst disk when the outlet opening is sealed by the burst disk;
    wherein activation of the initiator causes the initiator cap to move shearing a portion of the shaft portion from the support pin which allows the burst disk to rupture, and wherein the external containment device further comprises a screen portion wherein the shaft portion passes through the screen portion and portions of the burst disk are retained by the screen portion.

2. The external containment device as in claim 1, wherein the screen portion and the head portion are configured such that the head portion is retained by the screen portion.

3. The external containment device as in claim 2, wherein the shaft portion has a notch to promote shearing of the shaft portion when the initiator cap moves.

4. The external containment device as in claim 2, wherein a portion of the shaft portion passes completely the initiator cap and contacts a housing that is secured to the inflator.

5. An external containment device for an inflator, the containment device comprising:
    an outlet plate having an outlet opening;
    a burst disk disposed over the outlet opening;
    an initiator having an initiator cap;
    a support pin having a shaft portion and a head portion, the shaft portion being supported by the initiator cap and the head portion contacts the burst disk when the outlet opening is sealed by the burst disk;
    wherein activation of the initiator causes the initiator cap to move shearing a portion of the shaft portion from the support pin which allows the burst disk to rupture; and
    wherein a portion of the shaft portion is received within the initiator cap.

6. The external containment device as in claim 5, wherein the shaft portion has a notch to promote shearing of the shaft portion when the initiator cap moves.

7. The external containment device as in claim 5, further comprising a screen portion wherein the shaft portion passes through the screen portion and portions of the burst disk are retained by the screen portion.

8. The external containment device as in claim 5, further comprising a screen portion wherein the screen portion and the head portion are configured such that the head portion is retained by the screen portion.

9. The external containment device as in claim 5, wherein the shaft portion has a notch to promote shearing of the shaft portion when the initiator cap moves and wherein the shaft portion passes through a screen portion and portions of the burst disk are retained by the screen portion and wherein the screen portion and the head portion are configured such that the head portion is retained by the screen portion.

10. The external containment device as in claim 5, wherein the portion of the shaft portion passes completely through the initiator cap and contacts a housing that is secured to the inflator.

11. An inflation device for inflating an inflatable cushion of an airbag module, the inflation device comprising:
    a first chamber and a second chamber, the first chamber having a first volume of inflation gas and the second chamber having a second volume of inflation gas;
    a first inflation opening for allowing the first volume of inflation gas to pass therethrough;
    a second inflation opening for allowing the second volume of inflation gas to pass into the second chamber;
    an external containment device sealing the first inflation opening, the containment device comprising:
    an outlet plate having an outlet opening;
    a burst disk disposed over the outlet opening;
    an initiator having an initiator cap;
    a support pin having a shaft portion and a head portion, the shaft portion being supported by the initiator cap and the head portion contacts the burst disk when the outlet opening is sealed by the burst disk;
    wherein activation of the initiator causes the initiator cap to move shearing a portion of the shaft portion from the support pin which allows the burst disk to rupture; and
    a screen portion wherein the shaft portion passes through the screen portion and portions of the burst disk are retained by the screen portion and wherein the screen portion and the head portion are configured such that the head portion is retained by the screen portion.

12. The inflation device as in claim 11, wherein the shaft portion has a notch to promote shearing of the shaft portion when the initiator cap moves.

13. The inflation device as in claim 11, wherein the shaft portion has a notch to promote shearing of the shaft portion when the initiator cap moves.

14. The inflation device as in claim 13, wherein a portion of the shaft portion passes completely through the initiator cap and contacts a housing that is secured to the inflator.

15. The inflation device as in claim 11, wherein a portion of the shaft portion passes completely through the initiator cap and contacts a housing that is secured to the inflator.

16. The inflation device as in claim 15, wherein the shaft portion has a notch to promote shearing of the shaft portion when the initiator cap moves and wherein the shaft portion passes through the screen portion and portions of the burst disk are retained by the screen portion and wherein the screen portion and the head portion are configured such that the head portion is retained by the screen portion.

17. The inflation device as in claim 16, wherein the first volume of inflation gas is selected from the group comprising helium, argon, carbon dioxide, nitrogen and mixtures thereof and the second volume of inflation gas is selected from the group comprising helium, argon, carbon dioxide, nitrogen and mixtures thereof.

18. A method of rupturing a burst disk of an inflator, the method comprising:

supporting the burst disk with a support pin having a shaft portion and a head portion, the shaft portion being supported by an initiator cap of an initiator and the head portion contacting the burst disk, wherein the burst disk is disposed over an outlet opening and wherein the shaft portion passes through a screen portion disposed between the burst disk and the initiator cap; and shearing the shaft portion of the pin by moving the initiator cap from a first position to a second position by activating the initiator, wherein the head portion no longer supports the burst disk when the initiator cap is at the second position and the shaft portion is sheared from the support pin.

* * * * *